Dec. 25, 1934.  C. C. BENNETT  1,985,306
SPINDLE AND KING PIN GAUGE
Filed April 11, 1933  3 Sheets-Sheet 3
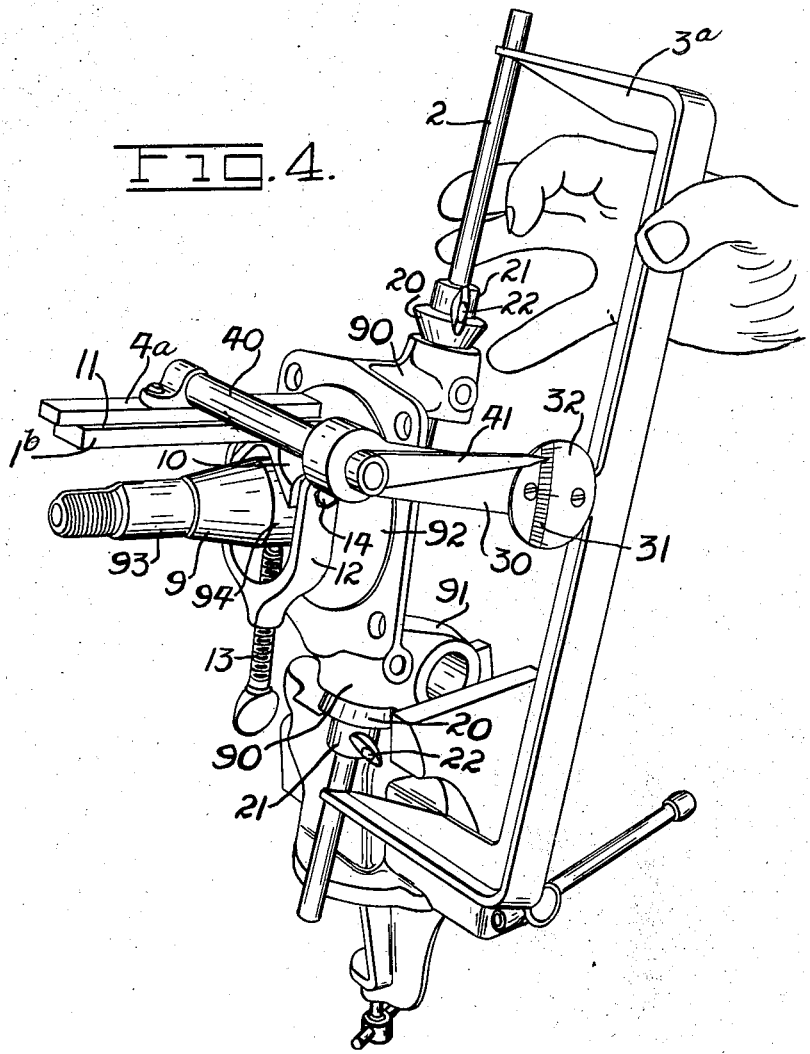
Inventor
Claude C. Bennett
By Reynolds & Reynolds
Attorneys Patented Dec. 25, 1934

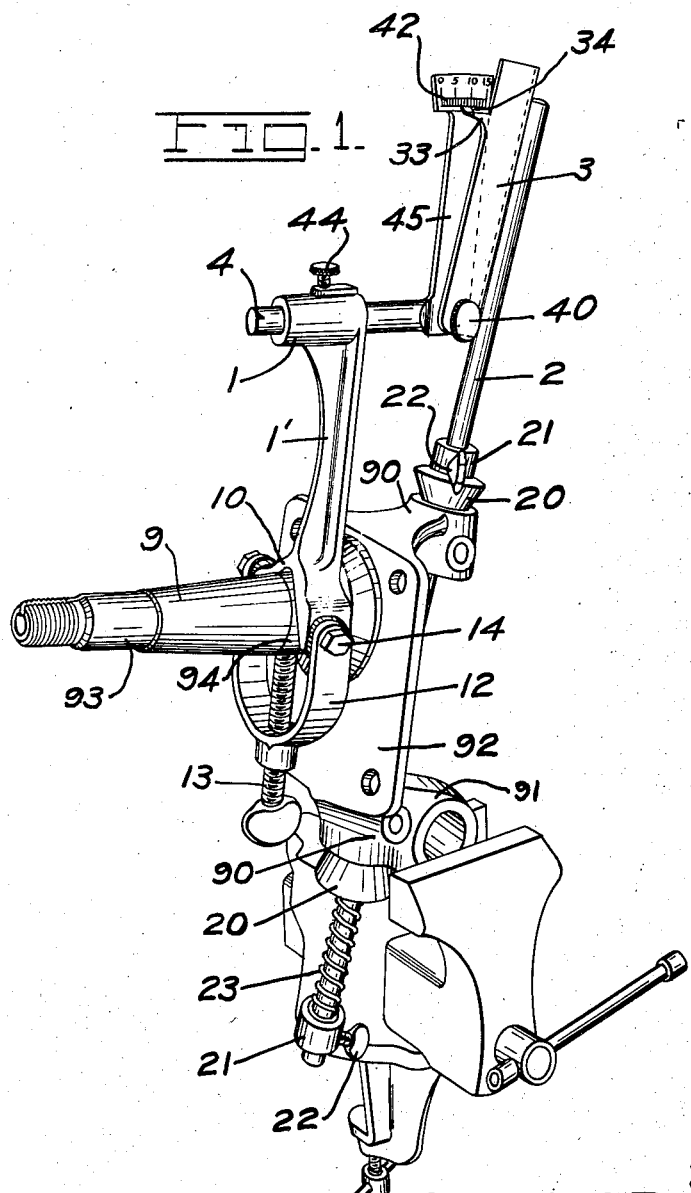

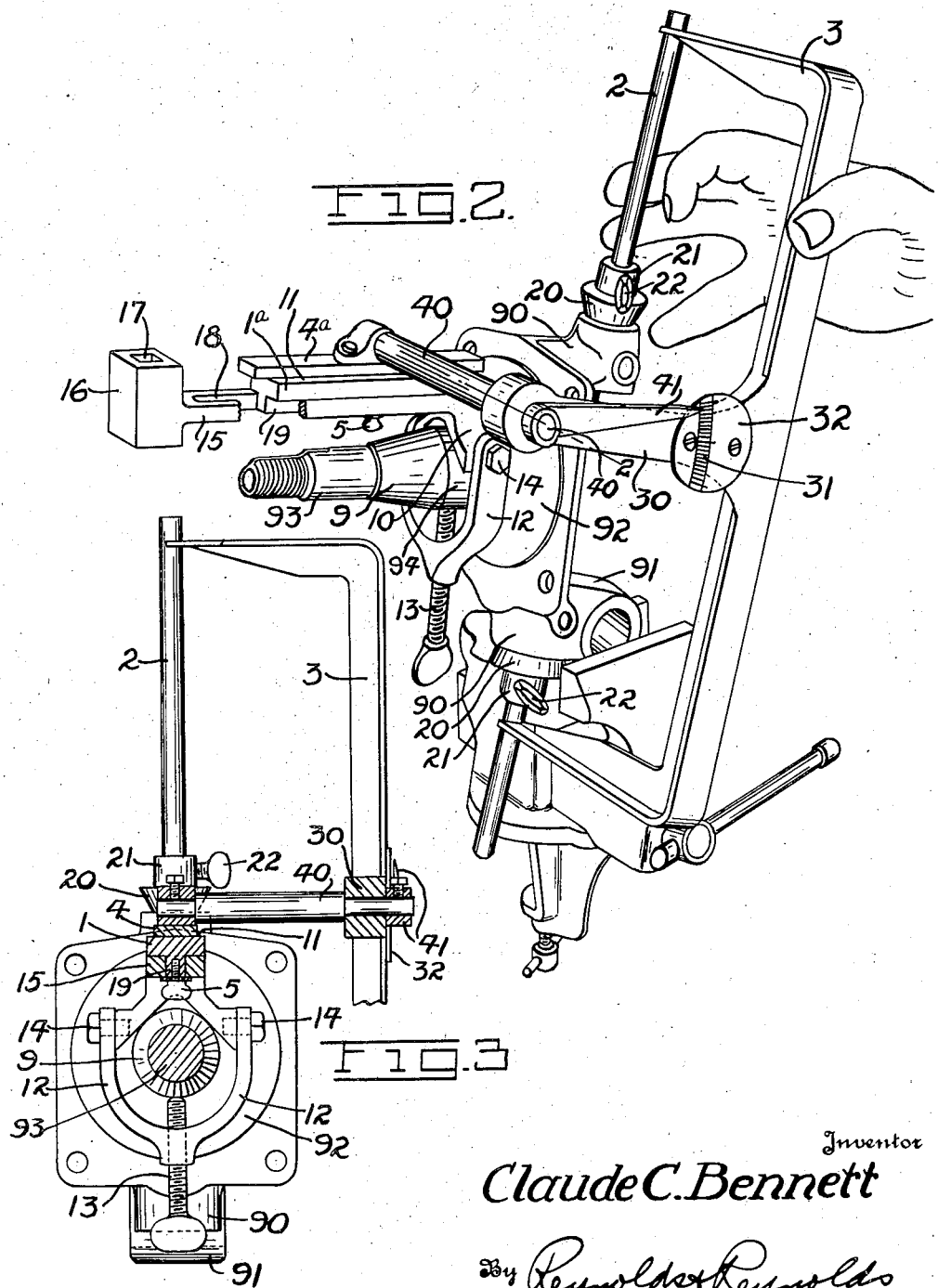

1,985,306

UNITED STATES PATENT OFFICE 1,985,306

SPINDLE AND KING PIN GAUGE

Claude C. Bennett, Seattle, Wash., assignor to A. E. Feragen, Inc., Seattle, Wash., a corporation of Washington Application April 11, 1933, Serial No. 665,567

6 Claims. (Cl. 33—203)

This application is a continuation in part of my application Serial No. 396,967, filed October 3, 1929.

In the gauging of the steering systems of automobiles it is essential that the camber of the wheel, the caster of the axle, and the lateral inclination of the king pin holes be accurate within small tolerances. Differences of one-half a degree frequently cause excessive tire wear, and render steering difficult.

There are many gauges for determining these factors and others, and after determination of error in these factors of camber, caster and king pin inclination it is customary to correct discrepancies from known standards by bending or twisting the axle, or by other means, and there are various instruments for performing such bending or twisting operations. However, in some instances error appearing to be due to incorrect camber, caster or king pin inclination, when found, and when corrected in the usual way by bending or twisting the axle, is found not to have been eliminated, perhaps even to have been aggravated, and the difficulty in such cases will usually be found to reside in a bent spindle body. There is one angular relationship between the axis of the spindle and the axis of the king pin or king pin holes associated with the spindle which is correct, and if this relationship in a given spindle body is incorrect, that is to say, if the spindle has been bent, or if the relationship has not been properly effected in the manufacture of the spindle body, no amount of corrective bending or twisting of the axle or other adjustment can eliminate the faults due to such causes, and usually it is necessary to replace the bent spindle with a new one.

However, because this is of infrequent occurrence, the trouble is usually diagnosed as being faulty camber, caster, or king pin inclination, and especially is this true since there has been, prior to my invention, no gauge means which can directly give the angle between the spindle axis and the king pin axis in a given spindle body.

It is an object of my invention, then, to provide a gauge means which can be directly applied to a spindle body, and by means of which can be directly read the angle between the spindle axis and the king pin axis, or the axis of the king pin holes, to the end that this source of error can be immediately and directly found, and to the end that the labor of attempting to correct the trouble by bending or twisting the axle, when such is not the source of error, can be eliminated.

It is therefore the principal object of this invention to provide a gauge which can be successfully applied to various types of spindle bodies, wherein the two axes to be gauged are not adjacent, but are usually separated by a mass of metal so that it is necessary to gauge around this mass.

Among other objects are to provide a gauge of the class indicated, which is simple and convenient to apply, inexpensive to manufacture, and to a considerable degree, self-adjusting.

My invention comprises the novel parts, and the novel combination and arrangement thereof, as shown in the accompanying drawings, described in the specification, and more particularly as defined by the claims which terminate the same.

In the accompanying drawings I have shown my invention in forms which are now preferred by me, these being understood, however, as convenient mechanical embodiments of my invention, and as illustrative of such embodiments, but not as constituting the sole means by which the invention can be carried out.

Figure 1 is a perspective view of the preferred form of my gauge, showing it applied to a spindle and the king pin holes, the spindle body being removed from the automobile and supported in a vise.

Figure 2 is a similar view of a somewhat modified form of my gauge.

Figure 3 is a transverse section of the modified form, on the line 3—3 of Figure 2.

Figure 4 is a perspective view similar to Figures 1 and 2, showing a further modified form of my gauge.

My invention, in the simplest form illustrated in Figure 1, comprises, in effect, two members, one of which is applied to the spindle to be positioned by such application in definite relationship to the axis of the spindle, and the other of which is applied to the king pin holes, to be thereby maintained in definite relationship to the axis of the king pin or the holes receiving the same, together with two members constituting indicating means or a gauging pair, and of a character to avoid the mass of the spindle body, one of these latter members being applied to the first mentioned element to be maintained thereby in definite relationship to the spindle axis, and the other being applied to the second element above, thereby to be maintained in definite relationship to the king pin axis, and the two members of the gauging pair having the one a scale and the other an index, whereby, upon such direct application, the angular relationship between the spindle axis and the king pin axis can be read directly.

Various means may be employed to carry out the principles of the invention as thus explained. As shown in Figure 1, the piece to be gauged comprises a spindle 9, arms 90, and a steering arm 91, all separated from and ordinarily cast integral with a base or metal mass 92. The member for application to the spindle may comprise a V-block 10 which is adapted to seat upon a cylindrical portion 94 of the spindle 9, or perhaps upon the cylindrical portion 93 of this spindle, this V-block being held in position by suitable means such as the yoke or clevis 12 pivoted to the V-block at 14, and clamped to the spindle by means such as the clamping screw 13. The device is thus easily applicable to a spindle, and when applied is held in definite—usually parallel—relationship to the axis thereof.

The member 1, which is supported by an arm 1' from the V-block 10, constitutes a guide or contact member, wherein is guided a member forming part of the gauging pair, for instance, the pin 4. The member 1 may be formed, in the preferred arrangement shown in Figure 1, as a guide sleeve, and the member 4 guided therein is a pin. The pin is maintained by the guide sleeve 1 in a plane which includes the axes of the spindle and of the king pin holes, and preferably is maintained by the sleeve parallel to the axis of the spindle, at any rate at some definite angular relationship to the spindle axis. The terms "guide" or "contact member" are intended to include any equivalent (unless the context requires otherwise) which by reason of contact of a complemental member therewith, positions this complemental member in definite relationship to the spindle axis, determined by the relationship thereto of the "guide" or "contact member."

The second mentioned member above, that which is maintained in definite relationship to the king pin holes, may be formed as a rod 2, which is inserted through the king pin holes in the arms 90 of the spindle body, and which is centered therein by means such as the cones 20, set collars 21, clamping screws 22, and the spring 23.

Cooperating with the pin 4 and forming the other member of the gauging pair is a contact member, herein taking the form of an arm 3 pivotally supported at 40 upon an end of the pin 4. The arm is intended for direct application to the rod 2, thus aligning itself or being easily aligned with this rod when in contact therewith, and by reason of such contact assuming a definite angular relationship relative to the pin 4. Associated with the rod 4 is a gauge arm 45 which may bear a scale 42, and the gauge arm 3 may have a gauge finger 33 bearing an index mark 34 which cooperates with the scale 42 to indicate in degrees or in any convenient units the angular relationship between the spindle axis and the king pin axis when the gauge is applied as shown in Figure 1.

The axis of the guide sleeve 1 being formed precisely parallel to the faces of the V-block 10, it follows that the pin 4, when received in the guide sleeve 1, will be precisely parallel to the axis of the spindle. The arm 3 directly contacting with the rod 2, it is evident that its edge of contact will be parallel to the axis of the king pin holes. Now if the scale 42 and index 34 are arranged to illustrate the angular relationship between the contact edge of the arm 3 and the axis of the pin 4, it is evident that when thus applied the angular reading of the scale will give directly the angle between the spindle axis and the axis of the king pin holes. The gauge may be conveniently held in position by a set screw 44.

In the form shown in Figures 2 and 3 is illustrated a gauge of the same general character, employing part of a gauge generally used by mechanics in connection with steering adjustments, and disclosed in Figure 6 of my Patent No. 1,653,249. By the use of such a device the mechanic need not buy a special gauge for this particular purpose, but can adapt such part of the other gauge to the same use.

Instead of the guide sleeve 1 I employ a contact bar 1a which bears a certain definite relationship to the axis of the spindle 9. Since the gauge arm 15, forming part of my gauge heretofore referred to and carrying the sleeve 16 at its end with an aperture 17 in which a gauge bar is normally secured as shown in Figure 2 of said patent, may not be accurate with relation to the faces of the V-block 10, I prefer to form on the bar 1a a flange 19 which is received within a slot 18 running longitudinally of the guide bar 15, the same being secured in place by such means as the set screw and washer 5. The upper surface 11 of the bar 1a is thus adjusted into parallelism with the faces of the V-block 10, and this upper surface 11 may now be used as a contact surface with which may be engaged the under surface of a plate 4a which functions identically as does the pin 4. In this form the plate 4a is secured upon a pivot shaft 40 pivotally supported in and preferably normal to an arm 30 forming part of and projecting laterally from a U-frame 3a. The frame is adapted to contact with the rod 2, and in this form the frame carries a scale plate 32, graduated as indicated at 31 in degrees, with which cooperates an index arm 41 secured upon the pivot shaft 40.

The V-block is applied to the spindle as before, the surface 11 being maintained in parallelism with the faces of the V-block, and with the rod 2 in place in the king pin holes, the frame 3a is applied to the rod, and the contact plate 4a is applied to the surface 11 of the bar 1a, whereupon the angular relationship between the spindle axis and the king pin axis can be read directly upon the scale 31.

In the form shown in Figure 4 a contact bar 1b is formed directly upon the V-block 10, hence its upper surface 11 may be finished in precise parallelism with the faces of the V-block 10, and the same frame and contact plates are applied as before to read directly the angle between the spindle axis and the king pin axis.

What I claim as my invention is:

1. A gauge for measuring the relative inclination of an automobile spindle relative to the axis of the associated king pin holes, comprising a contact bar, means for supporting the same in a definite relationship to the spindle axis, a frame, means for maintaining the same in a definite position corresponding to the inclination of the king pin axis, a contact plate adapted to contact with said contact bar, to be thereby brought into a definite position relative to the spindle axis, indicating means comprising an index scale and a gauge finger, one movable relative to the other, and an operative connection between one member of the indicating means and said contact plate, and between the other member and said frame.

2. In a gauge for measuring the relative inclination of the axes of an automobile spindle and the corresponding king pin holes, a contact bar and means for supporting it in parallelism to the spindle axis, a contact rod and means for supporting it coaxially with the king pin axis, a pair of pivotally connected contact members comprising a U-frame adapted to contact with the rod at spaced points, and a contact plate adapted to rest upon and conform to the plane of the contact bar, said contact plate being pivotally supported upon said U-frame, thereby to assume a definite relationship each to the corresponding axis, and means associated with the relatively movable contact members to indicate their relative angular relationship.

3. In a gauge for measuring the relative inclination of the axes of an automobile spindle and the corresponding king pin holes, a contact bar and means for supporting it in parallelism to the spindle axis, a contact rod and means for supporting it coaxially with the king pin axis, a pair of pivotally connected contact members comprising a U-frame adapted to contact with the rod at spaced points, an arm projecting from said U-frame offset from its plane, a contact plate pivotally supported upon said arm and adapted to rest upon and conform to the plane of the contact bar, and indicating means comprising a gauge finger secured to move with the contact plate and an index scale carried by said arm.

4. In a gauge for measuring the relative inclination of the axes of an automobile spindle and the corresponding king pin holes, a contact bar and means for supporting it comprising a V-block fixed in relationship to the contact bar and means for clamping the same upon a cylindrical portion of the spindle, the upper surface of the contact bar being in a plane parallel to the lines of contact of said V-block and the spindle, whereby the upper surface of the contact bar is held parallel to the axis of the spindle, a contact rod and means for supporting it coaxially with the king pin axis, a pair of pivotally connected contact members adapted to contact simultaneously one with the contact bar and the other with the rod, thereby to assume a definite relationship each to the corresponding axis, and means associated with the relatively movable contact members to indicate their relative angular relationship.

5. The combination of claim 4, the support for the contact bar including a slotted arm extending from the V-block substantially parallel with the lines of contact between the V-block and the spindle, a rib upon the under side of said contact bar received in the slot in said arm, and means for securing said rib in said slot.

6. A gauge for measuring the inclination of an automobile spindle relative to the axis of the associated king pin hole, comprising a guide member, a support therefor including a V-block engaging the upper surface of the cylindrical spindle portion, a yoke pivotally connected to said V-block and suspended beneath the spindle, means carried by said yoke for engagement with the under side of the spindle to secure the support in position to dispose the guide member in a definite, known relation to the spindle axis, a rod aligned with the king pin axis, and gauge means adapted to contact said rod and including a member guided in said guide member, to indicate the angular relationship between said rod and said guide member, thus to indicate the angular relationship between the spindle and king pin axes.

CLAUDE C. BENNETT.